(12) United States Patent
Weber

(10) Patent No.: US 6,327,726 B1
(45) Date of Patent: Dec. 11, 2001

(54) BABY DIAPER-CHANGING PAD FOR USE IN A MOTOR VEHICLE

(75) Inventor: Norbert Weber, Bondorf (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/366,536

(22) Filed: Aug. 4, 1999

(30) Foreign Application Priority Data

Aug. 4, 1998 (DE) .............................................. 198 35 148

(51) Int. Cl.⁷ .............................. A47D 13/08; A47G 9/06
(52) U.S. Cl. ...................... 5/655; 5/94; 5/118; 297/219.1
(58) Field of Search .............................. 5/655, 652, 657, 5/94, 118, 417, 420, 485, 496; 297/224, 219.1, 225, 188.01, 188.03, 188.07

(56) References Cited

U.S. PATENT DOCUMENTS

| | | | | |
|---|---|---|---|---|
| 324,839 | * | 8/1885 | Hazen ........................... 297/219.1 X |
| 400,131 | * | 3/1889 | Small ....................................... 5/122 |
| 1,171,531 | * | 2/1916 | Muther ..................................... 5/118 |
| 1,259,220 | * | 3/1918 | Fischer ..................................... 5/118 |
| 2,641,773 | * | 6/1953 | Kramer ....................................... 5/94 |
| 2,688,998 | * | 9/1954 | Erickson et al. .................. 297/219.1 |
| 2,790,184 | * | 4/1957 | Testa ........................................ 5/118 |
| 2,853,718 | * | 9/1958 | Lim ............................................ 5/94 |
| 3,574,872 | * | 4/1971 | Mattila ....................................... 5/94 |
| 3,735,430 | * | 5/1973 | Platz ....................................... 5/94 X |
| 4,781,277 | * | 11/1988 | Lim ....................................... 5/655 X |
| 4,886,150 | * | 12/1989 | Fitzsimmons ........................ 5/420 X |
| 4,943,105 | * | 7/1990 | Kacar et al. ............................ 5/94 X |
| 5,692,257 | * | 12/1997 | Albertieri ................................. 5/655 |
| 5,897,165 | * | 4/1999 | Kucharczyk et al. ...... 297/219.12 X |
| 6,073,998 | * | 6/2000 | Siarkowski et al. .......... 297/219.1 X |
| 6,086,152 | * | 7/2000 | Zeller ............................ 297/219.1 X |

FOREIGN PATENT DOCUMENTS

2220407 * 1/1990 (GB) ....................................... 5/420

OTHER PUBLICATIONS

"Self–Adhering Nylon Tapes", *Journal of AMA,* vol. 168 No. 7, Maurice Gershman, M.D.*

* cited by examiner

*Primary Examiner*—Robert G. Santos
(74) *Attorney, Agent, or Firm*—Crowell & Moring LLP

(57) ABSTRACT

A baby diaper-changing pad suitable for use in a passenger motor vehicle having at least two rows of seats has a roll-up mat of an elastic material which has at two opposite ends straps and/or loops by which the mat can be affixed to two head supports of two seats of the vehicle disposed one behind the other in the direction of travel. A soft baby pad is provided on the inner side between the ends with the straps and/or loops. The arrangement of the baby pad on the mat and the dimensions of the mat and of its straps and/or loops are chosen such that, when the mat is affixed to the head supports, it rests in that area with its exterior on a seat surface of the rear seat in the direction of travel in which the baby pad is disposed on the inner side of the mat.

20 Claims, 2 Drawing Sheets

BABY DIAPER-CHANGING PAD FOR USE IN A MOTOR VEHICLE

BACKGROUND OF THE INVENTION

This application claims the priority of 198 35 148.8-16, filed Aug. 4, 1998, the disclosure of which is expressly incorporated by reference herein.

The present invention relates to a baby diaper-changing pad which is suitable for use in a passenger automobile having at least two rows of seats.

When traveling with little children in a motor vehicle, a situation occasionally arises that the child must have its diaper changed and there is no space available for the purpose except in the motor vehicle. The easiest thing is then to do the changing on one of the back seats of the motor vehicle, depositing the child on the bench of the particular back seat. It is desirable to place a kerchief or the like under the baby to protect the bench surface against soiling.

Moreover it is possible to carry in the vehicle a diaper changing pad which is provided for use in the home on a changing table, and then lay it on the seat to protect the latter. Such a changing pad, however, is relatively bulky and also is not designed to fit the dimensions of the back seat of a motor vehicle, so that a diaper changing pad, used as it was not originally intended to be used, is especially unable to assure secure lateral support for the baby.

DE 44 01 558 A1 discloses a carrier for a vehicle which is closed by a covering when in the transport mode. To open the carrier the covering can be turned up about a hinge to a use position in which the inside of the covering can then be used, especially as a diaper-changing pad.

DE 196 40 950 A1 shows a mat for the rear seat area of motor vehicles for carrying dogs. In the area of the perimeter of the mat fastening, means are disposed to permit the mat to be fastened loosely hanging from fixed parts of the car. For this purpose attaching belts or the like, to make the connection between the blanket and the particular car-fixed part. The fastening devices have at least in part a swivel part and a holding part turning on the latter substantially in the plane of the mat or a plane parallel thereto to the frame of the belt.

DE Gebrauchsmuster 72 22 332 describes a device for bridging the foot space between the front and back seats in a passenger motor car, which serves as a child's couch. A mat-shaped, non-rigid platform is provided along opposite margins with fastening apparatus for attaching the platform on one side to the rear seats of the passenger motor vehicle and on the other side to the backs of the front seats of the passenger motor vehicle.

SUMMARY OF THE INVENTION

An object of the present invention is to provide an improved diaper-changing pad which can be used in a passenger car with at least two rows of seats.

This object has been achieved according to the present invention by a diaper-changing pad which has a roll-up mat of an elastic material which has straps and/or loops at two opposite ends. The mat can be attached to two head supports of two seats of the motor vehicle arranged one behind the other in the direction of travel and is equipped between the ends provided with the straps and/or loops with a soft baby pad on its inner side. The arrangement of the baby pad on the mat and the dimensions of the mat and its straps and/or loops are selected such that, with the mat attached to the head supports, the mat lies with its outer side on a seat surface of the rear seat in the direction of travel on which the baby pad is arranged on the inner side of the mat.

The present invention is based on the recognition of the advantages of adapting a diaper-changing pad to the available space in a passenger automobile and providing a suitable fixation that will provide a secure holding of the changing pad with regard to the surface of the rear seat. The diaper-changing pad according to the present invention is thus secured against slipping, thereby improving the safety of the baby. By configuring the pad as a roll-up mat, the latter can be stowed compactly in the vehicle.

In an advantageous embodiment of the baby diaper-changing pad, the dimensions of the mat can be selected such that the mat, suspended or affixed in the manner of a hammock, reaches upward on both sides of the changing pad. Thus a baby laid on the changing pad can be secured laterally.

Furthermore, the formation of a separate baby changing pad on the inner side of the roll makes possible the selection of materials and substances for the mat that are especially suited for the particular purpose. For example, the baby pad can consist of an absorbent material and be configured as a cushion, while the mat is made impermeable to fluids, especially of a plastic material. In this manner the baby pad is especially kind to the skin, while the mat effectively protects the back seat against soiling.

In a currently preferred embodiment of the diaper-changing pad according to the invention, the baby pad can be fastened removably to the mat, especially by a slide fastener or by a hook-and-loop closure. This arrangement makes it possible to clean the baby pad thoroughly, for example in a washing machine, so that adequate cleanliness of the changing pad can be assured.

In another embodiment of the changing pad, a plurality of pockets can be provided on the inside of the mat between the ends which are provided with straps and/or loops and the baby pad for stowing various articles such as cleaning cloths, baby cream, baby powder, a toy, and a change of clothing. Thereby, the changing pad is expanded to a complete diaper-changing outfit which can be carried regularly in the vehicle in an especially compact way.

In an embodiment of the diaper-changing pad according to the invention, additional pockets can be arranged, under the baby pad on the inside of the mat and can be especially adapted to the dimensions of fresh diapers. These measures permit, on one hand, the availability of additional storage space which, on the other hand, especially if fresh diapers are contained in the extra pockets, increases the convenience of the baby pad.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
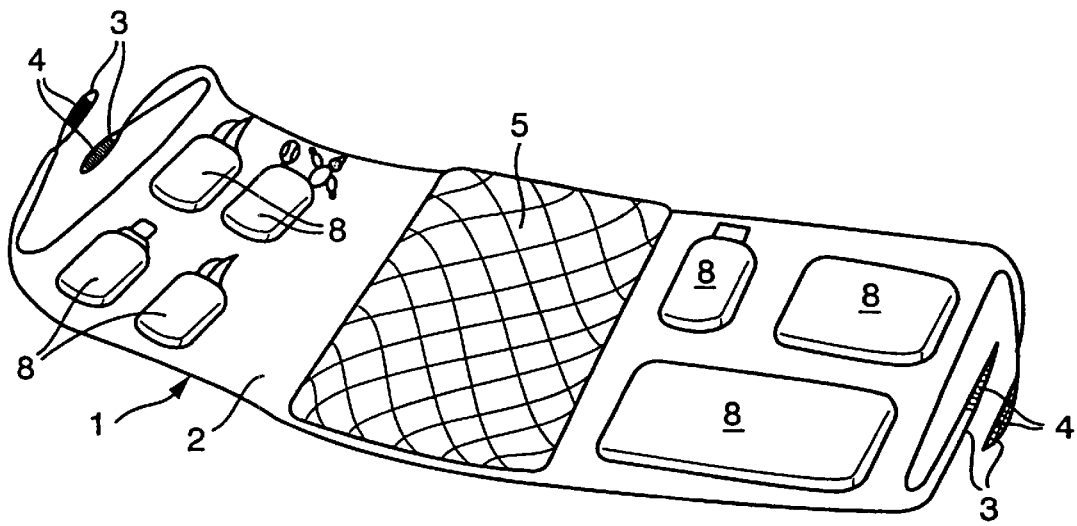
FIG. 1 is a perspective plan view of a diaper-changing pad according to the invention in a rolled out substantially flat condition.
Figure 2:
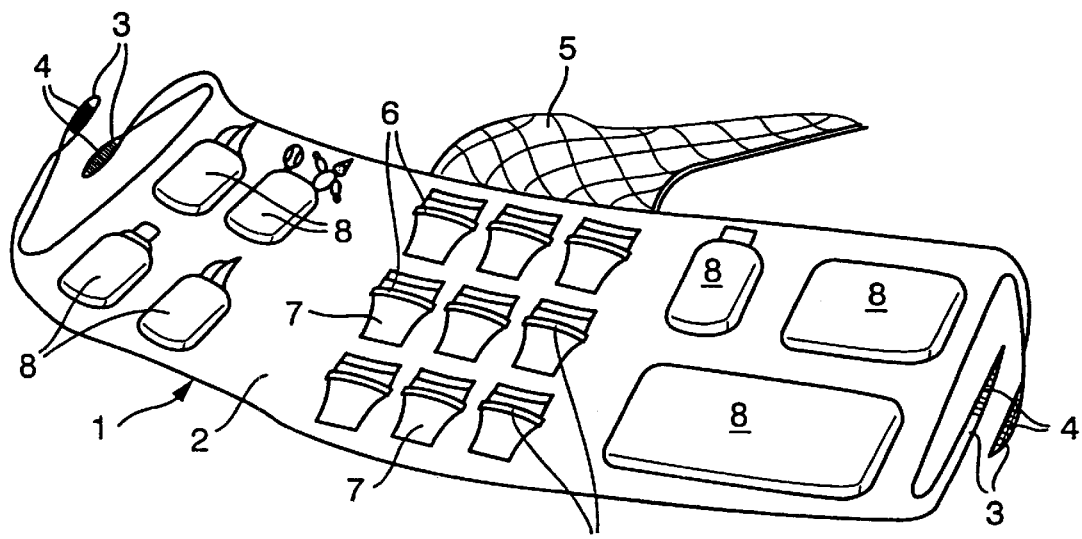
FIG. 2 is a perspective plan view as in FIG. 1, but with the baby pad folded away.
Figure 3:
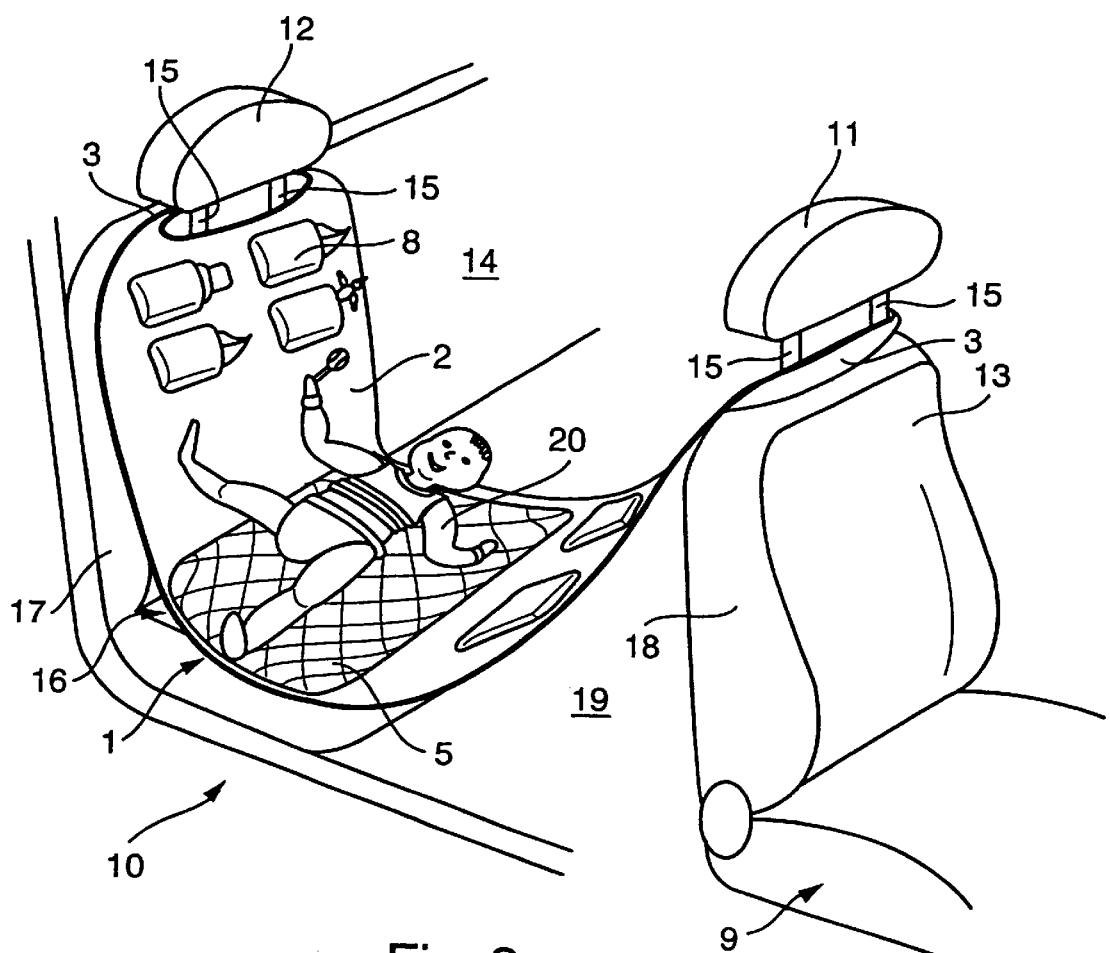
FIG. 3 is a perspective view of the diaper-changing pad of the invention in its use position in the diapering of a baby.

A diaper-changing pad according to the invention as seen in FIGS. 1–3 has a mat 2 which consists of an elastic material. The material of the mat 2 is selected such that the mat 2 and with it the complete diaper-changing pad 1 can be rolled up. As seen in FIGS. 1 to 3, the diaper-changing pad 1 of the invention is shown, however, in its unrolled or rolled out state for use.

The mat 2 has at two opposite ends or sides straps 3 which are equipped at their extremities in the embodiment with a hook-and-loop closure 4. The hook-and-loop closures 4 allows two straps 3 of each end of the mat to be attached together to form a closed loop. In another embodiment of the diaper-changing pad 1 these loops can be formed complete, in one piece, on the mat 2.

Between the ends of mat 2 equipped with the straps 3, a baby pad 5 is disposed on the inside of the mat 2, which in the illustrated embodiment, is attached to the mat 2 along one of its lateral edges—on the upper lateral edge in FIGS. 1 and 2—such that the baby pad 5 can be folded away from the mat 2 as seen in FIG. 2. That is, while FIG. 1 shows the normal position of use of the baby pad 5, FIG. 2 shows the diaper-changing pad with the baby pad 5 folded up off the mat 2.

The baby pad 5 is preferably made of a cushion-like, cotton-filled, absorbent material kind to the skin, which assures a comfortable bed for a baby being changed. Also, it can be provided that the baby pad 5 is attached releasably, e.g., by a slide fastener or a hook-and-loop tape, to the mat 2, so that the baby pad 5 can be washed separately from the mat. Preferably the baby pad 5 is made washing machine-proof.

FIG. 2 clearly shows that on the inside of the mat 2, in the area on which the baby pad 5 lies on the mat 2, additional pockets or straps 6 are provided whereby in this embodiment fresh diapers 7 are fastened to the diaper-changing pad 1. By arranging the soft diapers 7 under the baby pad 5, the support of the baby is especially soft.

Provided on the inside of the mat 2, between the ends provided with the straps and the middle area equipped with the baby pad 5, additional pockets 8 serve to contain various objects. For example, body care substances such as powder, creams, wash cloths, oil pads, as well as a change of clothing and toys can be stowed. Also, one of the pockets can be especially designed to hold soiled diapers.

FIG. 3 shows the diaper-changing pad according to the invention during use in a passenger motor vehicle which has at least two rows of seats 9, 10. The diaper-changing pad 1 is used by first being unrolled and fastened by the straps 3 to head supports 11, 12 of respective seats 13, 14, arranged one behind the other, of the two seat rows 9, 10. The loops formed by the straps 3 are placed around the head supports 11, 12. FIG. 3 shows that the dimensions of the mat 2 and of the straps 3 are matched or sized to the vehicle such that the pad 1, when in its use state is positioned between the front seat 13 and the rear seat 14 is such that the section of the mat 2 that holds the baby pad lies on a bench position 16 of the rear seat 14.

Furthermore, the mat 2 is of such size that it reaches at one end to the front side of the back position 17 of the rear seat 14 and at the other end toward the back of a seat back 18 of the front seat 13 and to the head supports 11 of the front seat 13. This configuration provides, on one hand, an effective protection of the rear seat 14 against soiling and, on the other hand, a foot space 19 formed between the seats 13, 14 which is covered by the part of mat 2 facing the front seat 13. Thereby, especially a baby 20 placed on the baby pad 5 cannot even accidentally fall easily into the foot space 19. It is especially clear from FIG. 3 that the adroit arrangement of the pockets 8 in the areas of the mat 2 adjacent the side of the baby pad 5 permit the user of the diaper-changing pad 1 easy access to the necessary articles for the care of the baby 20. All the necessary care articles are in easy reach so that changing the diapers can be done without great problems.

Figure 4:
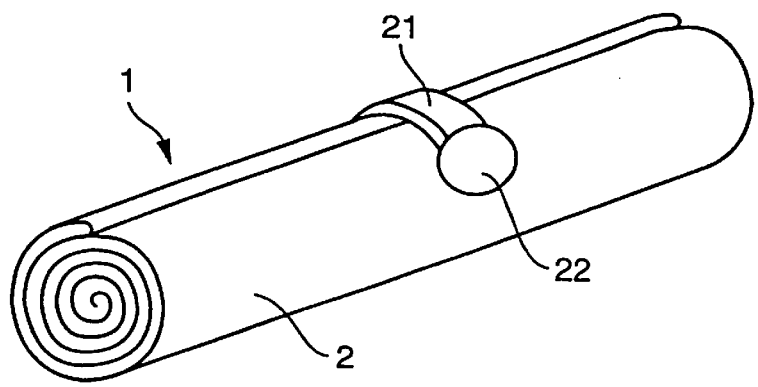
FIG. 4 is a perspective view of the changing pad rolled up for transport.

FIG. 4 shows the diaper-changing pad 1 in its rolled-up state. A closing apparatus, for example a strap 21 with a buckle 22 can be provided, with which the roll of diaper-changing pad 1 can be secured. In its transportation state shown in FIG. 4, the diaper-changing pad 1 according to the invention can be contained very compactly in a vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A baby diaper-changing pad sized for use in a passenger motor vehicle having forward and rear seats, each seat having a bench position and a back rest, comprising:
    a roll-up mat having a generally oblong shape with longitudinal sides for extending in a longitudinal direction of the vehicle and having ends narrower than the longitudinal sides, with an attaching device at each of the narrower ends thereof for attaching the mat at the forward and rear seats, and
    a soft baby pad provided between the opposite ends on an inner side of the mat, wherein the baby pad is provided on the mat between the narrow ends,
        wherein the dimensions of the mat and each attaching device are selected such that, when the mat is attached at the front and rear seats, the mat lies with an outer side thereof on a seat surface of the rear seat and the baby pad is provided on the inner side of the mat such that the baby pad lies substantially entirely on the bench position of the rear seat, and
        wherein the narrow ends are substantially narrower than the longitudinal sides, and the baby pad is located substantially centrally of the narrow ends.

2. The baby diaper-changing pad according to claim 1, wherein the dimensions of the mat are selected such that the mat is capable of reaching at one end thereof at least one of a back of a back rest and the head support of the front seat.

3. The baby diaper-changing pad according to claim 1, wherein in that the baby pad is attached removably to the mat.

4. The baby diaper-changing pad according to claim 3, wherein the dimensions of the mat are selected such that the mat is capable of reaching at one end thereof at least one of a back of a back rest and the head support of the front seat.

5. The baby diaper-changing pad according to claim 1, wherein a plurality of pockets are operatively attached on the inner side of the mat between the ends provided with the attaching devices and the baby pad, for stowing various utensils.

6. The baby diaper-changing pad according to claim 1, wherein pockets are disposed on the inner side of the mat under the baby pad, the baby pad being attached to the mat so as to be adjustable between a first position lying on the additional pockets and a second position which permits access to the additional pockets.

7. The baby diaper-changing pad according to claim 6, wherein the pockets are sized for accommodating fresh diapers.

8. The baby diaper-changing pad according to claim 1, wherein each attaching device includes straps for affixing the mat to the head supports and the straps are each provided with one of a hook-and-loop closure and a catch arrangement.

9. The baby diaper-changing pad according to claim 1, wherein each attaching device includes straps which form loops which are closed in one piece and configured to be hangable on the head supports to attach the mat in an operative position thereof.

10. The baby diaper-changing pad according to claim 9, wherein the loops are configured as a stretchable strap.

11. The baby diaper-changing pad according to claim 1, wherein each attaching device includes at least one strap which is operatively provided on the outer side of the mat for fixing the mat in a rolled-up state.

12. The baby diaper-changing pad according to claim 11, wherein the at least one strap further comprises a closure, including one of a hook-and-loop closure or a clip and snap catch.

13. The baby diaper-changing pad according to claim 1, wherein the roll-up mat is made of an elastic material.

14. The baby diaper-changing pad according to claim 1, wherein the mat is dimensioned such that when the mat is attached at the front and rear seats, a portion of the outer side of the mat which is located substantially between one of the narrow ends and the baby pad lies substantially entirely along the back position of the rear seat.

15. The baby diaper-changing pad according to claim 1, wherein the attaching devices attach at one of the forward seats and one of the rear seats, and the baby pad is located intermediate the narrow ends.

16. A baby diaper-changing pad sized for use in a passenger motor vehicle having forward and rear seats, each seat having a bench position and a back rest, comprising:
   a roll-up mat having a generally oblong shape with longitudinal sides for extending in a longitudinal direction of the vehicle and having ends substantially narrower than the longitudinal sides, with an attaching device at each of the narrower ends thereof for attaching the mat at the forward and rear seats, and
   a soft baby pad provided between opposite ends of the roll-up mat on an inner side of the mat, wherein the baby pad is provided on the mat substantially centrally of the narrow ends.

17. A baby diaper-changing pad sized for use in a passenger motor vehicle having forward and rear seats, each seat having a bench position and a back rest, comprising:
   a roll-up mat having a generally oblong shape with longitudinal sides for extending in a longitudinal direction of the vehicle and having ends narrower than the longitudinal sides, with an attaching device at each of the narrower ends thereof for attaching the mat at the forward and rear seats, and
   a soft baby pad provided between the opposite ends on an inner side of the mat, wherein the baby pad is provided on the mat between the narrow ends,
      wherein the dimensions of the mat and each attaching device are selected such that, when the mat is attached at the front and rear seats, the mat lies with an outer side thereof on a seat surface of the rear seat and the baby pad is provided on the inner side of the mat such that the baby pad lies substantially entirely on the bench position of the rear seat, and
      wherein pockets are disposed on the inner side of the mat under the baby pad, the baby pad being attached to the mat so as to be adjustable between a first position lying on the additional pockets and a second position which permits access to the additional pockets.

18. The baby diaper-changing pad according to claim 17, wherein the pockets are sized for accommodating fresh diapers.

19. A baby diaper-changing pad sized for use in a passenger motor vehicle having forward and rear seats, each seat having a bench position and a back rest, comprising:
   a roll-up mat having a generally oblong shape with longitudinal sides for extending in a longitudinal direction of the vehicle and having ends narrower than the longitudinal sides, with an attaching device at each of the narrower ends thereof for attaching the mat at the forward and rear seats, and
   a soft baby pad provided between the opposite ends on an inner side of the mat, wherein the baby pad is provided on the mat between the narrow ends,
      wherein the dimensions of the mat and each attaching device are selected such that, when the mat is attached at the front and rear seats, the mat lies with an outer side thereof on a seat surface of the rear seat and the baby pad is provided on the inner side of the mat such that the baby pad lies substantially entirely on the bench position of the rear seat, and
      wherein each attaching device includes straps which form loops which are closed in one piece and configured to be hangable on the head supports to attach the mat in an operative position thereof.

20. The baby diaper-changing pad according to claim 19, wherein the loops are configured as a stretchable strap.

* * * * *